United States Patent
Hamada (10) Patent No.: US 11,698,126 B1
(45) Date of Patent: Jul. 11, 2023

(54) DRIVING SOURCE ASSEMBLY

(71) Applicant: KAWASAKI MOTORS, LTD., Akashi (JP)

(72) Inventor: Ayumi Hamada, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/847,070

(22) Filed: Jun. 22, 2022

(51) Int. Cl.
| F16H 57/02 | (2012.01) |
| F16H 57/04 | (2010.01) |
| F16H 57/035 | (2012.01) |
| F16H 57/029 | (2012.01) |
| F16H 57/031 | (2012.01) |

(52) U.S. Cl.
CPC ......... *F16H 57/035* (2013.01); *F16H 57/029* (2013.01); *F16H 57/031* (2013.01); *F16H 57/0416* (2013.01); *F16H 57/0489* (2013.01)

(58) Field of Classification Search
CPC .... F16H 57/029; F16H 57/031; F16H 57/035; F16H 57/0416; F16H 57/0489; F16H 2057/0216

See application file for complete search history.

(56) References Cited

U.S. PATENT DOCUMENTS

| 3,467,177 | A | * | 9/1969 | Hoddinott | ........... F16H 57/0489 165/47 |
| 7,427,248 | B2 | | 9/2008 | Chonan | |
| 8,439,141 | B2 | | 5/2013 | Bessho et al. | |
| 8,459,397 | B2 | | 6/2013 | Bessho et al. | |
| 9,528,595 | B2 | * | 12/2016 | Itoo | ........ F16H 57/027 |
| 2015/0308561 | A1 | | 10/2015 | Itoo et al. | |

FOREIGN PATENT DOCUMENTS

| CN | 1719064 A | * | 1/2006 | |
| EP | 1880934 A2 | * | 1/2008 | ............. B60K 13/02 |
| JP | 2008138759 A | * | 6/2008 | ............. B60K 17/06 |
| KR | 100635968 B1 | * | 10/2006 | |

* cited by examiner

*Primary Examiner* — Adam D Rogers
(74) *Attorney, Agent, or Firm* — Alleman Hall Creasman & Tuttle LLP (57) ABSTRACT

A driving source assembly includes: a prime mover including a driving shaft; a continuously variable transmission including a CVT case; a first gear that is between the prime mover and the CVT case and rotates together with the driving shaft; a second gear that is meshable with the first gear; an energy converter including a rotating shaft that rotates in association with the second gear; and a plate which is fixed to the prime mover and to which the energy converter is fixed. The first gear is between the plate and the CVT case. The CVT case includes a recess that defines an auxiliary accommodating space accommodating the first gear. The seal is between the recess and the plate.

12 Claims, 9 Drawing Sheets

DRIVING SOURCE ASSEMBLY

BACKGROUND OF THE INVENTION

Field of the Invention

The present disclosure relates to a driving source assembly including a prime mover and a continuously variable transmission.

Description of the Related Art

US 2015/0308561 A1 discloses a continuously variable transmission of a utility vehicle. The continuously variable transmission is attached to a plate fixed to a side surface of an internal combustion engine. A crank shaft of the internal combustion engine penetrates the plate. A flywheel is at an end portion of the crank shaft. The flywheel includes external teeth at an outer peripheral portion thereof and also serves as a gear. A starter motor that rotates a gear meshing with the external teeth of the flywheel is attached to the plate.

SUMMARY OF THE INVENTION

A driving source assembly according to one aspect of the present disclosure includes: a prime mover including a driving shaft; a continuously variable transmission including a CVT structure and a CVT case, the CVT structure changing rotational speed of rotational power input from the driving shaft, the CVT case defining a main accommodating space accommodating the CVT structure; a first gear that is between the prime mover and the CVT case and rotates together with the driving shaft; a second gear that is meshable with the first gear; an energy converter including a rotating shaft that rotates in association with the second gear; a plate which includes a first surface and a second surface and is fixed to the prime mover and to which the energy converter is fixed, the first surface being opposed to the prime mover and the energy converter, the second surface being opposed to the CVT case; and a seal. A side of the continuously variable transmission which is close to the prime mover in an arrangement direction is referred to as a first side. A side of the continuously variable transmission which is far from the prime mover in the arrangement direction is referred to as a second side. The first gear is between the plate and the CVT case. The CVT case includes a recess that defines an auxiliary accommodating space accommodating the first gear and is open toward the first side in the arrangement direction. The plate closes an opening of the recess from the first side in the arrangement direction. The seal surrounds the opening and is between the recess and the plate.

DESCRIPTION OF THE PREFERRED EMBODIMENTS

Hereinafter, an embodiment will be described with reference to the drawings.

Figure 1:
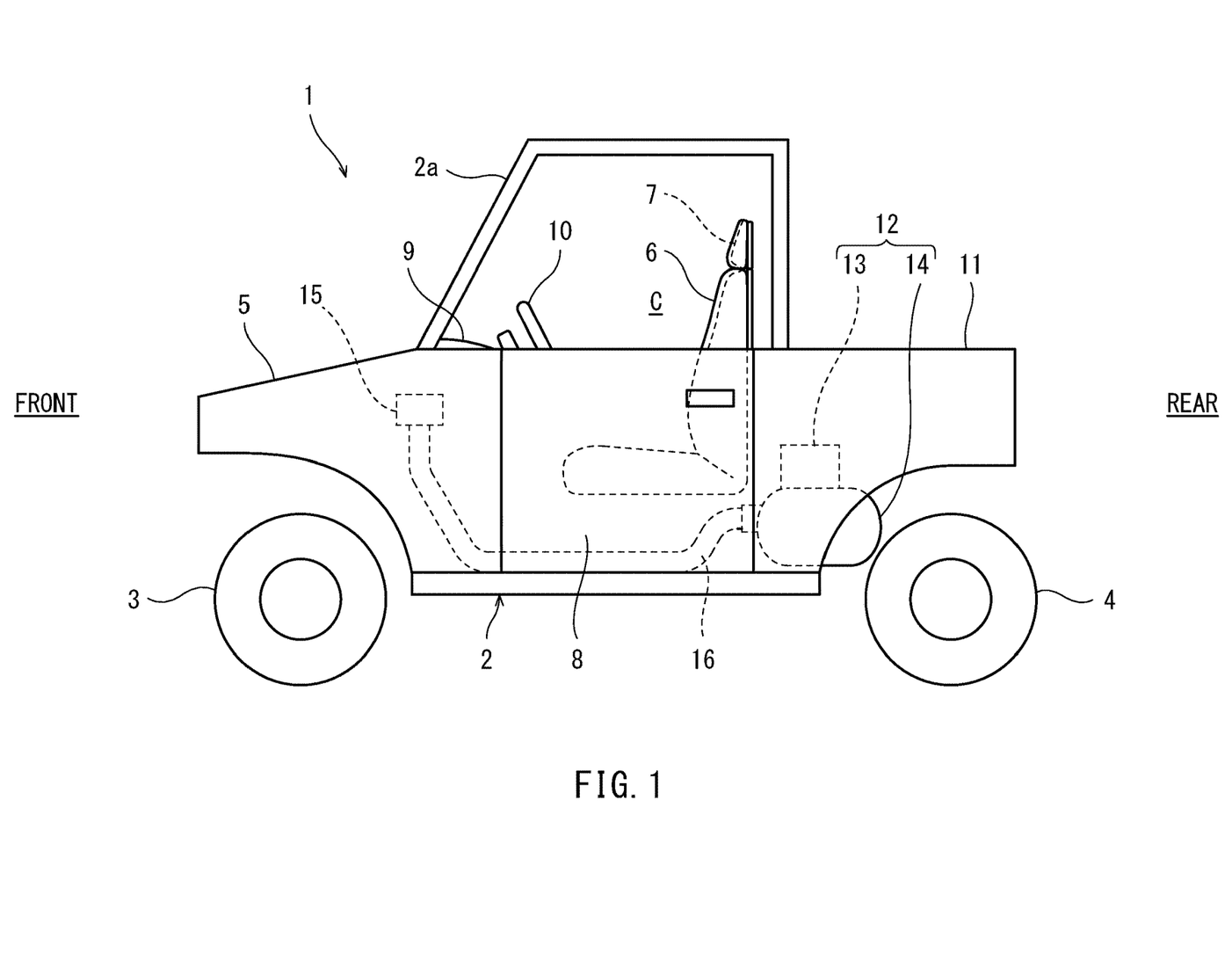
FIG. 1 is a schematic left side view of a utility vehicle according to an embodiment.

FIG. 1 is a schematic left side view of an off-road vehicle 1 according to the embodiment. As shown in FIG. 1, the off-road vehicle 1 includes a vehicle body frame 2, a pair of left and right front wheels 3 supporting a front portion of the vehicle body frame 2, and a pair of left and right rear wheels 4 supporting a rear portion of the vehicle body frame 2. Tires of the front wheels 3 and the rear wheels 4 are, for example, balloon tires for uneven ground traveling. The off-road vehicle 1 may be referred to as a utility vehicle. A space between the left and right front wheels 3 is covered with a hood 5 from above. A driver's seat 6 and a passenger seat 7 are located side by side behind the hood 5 and are supported by the vehicle body frame 2.

The vehicle body frame 2 is a pipe frame including pipes connected to each other. The vehicle body frame 2 includes, for example, a cabin frame 2a surrounding an occupant space C in which the driver's seat 6 and the passenger seat 7 are. Entrances that are opened or closed by side doors 8 are open at both sides of the occupant space C. The occupant space C surrounded by the cabin frame 2a is exposed to an outside. A dash panel 9 is in front of the driver's seat 6 and the passenger seat 7. A steering wheel 10 is located at the dash panel 9 so as to project toward the driver's seat 6.

A cargo bed 11 defining a hollow loading space that is open upward to an outside is behind the cabin frame 2a. A driving source assembly 12 is mounted behind the driver's seat 6 and under the cargo bed 11. The driving source assembly 12 includes an internal combustion engine 13 and a continuously variable transmission 14. The internal combustion engine 13 is one example of a prime mover. The continuously variable transmission 14 is adjacently located at a lateral side of the internal combustion engine 13. Rotational power output from the continuously variable transmission 14 is transmitted to one or both of the front wheels 3 and the rear wheels 4. An air cleaner 15 that takes outside air therein is in front of the steering wheel 10 and under the hood 5. The air cleaner 15 is connected to the continuously variable transmission 14 through an air-intake pipe 16. The outside air as cooling air is supplied to the continuously variable transmission 14 through the air cleaner 15 and the air-intake pipe 16.

Figure 2:
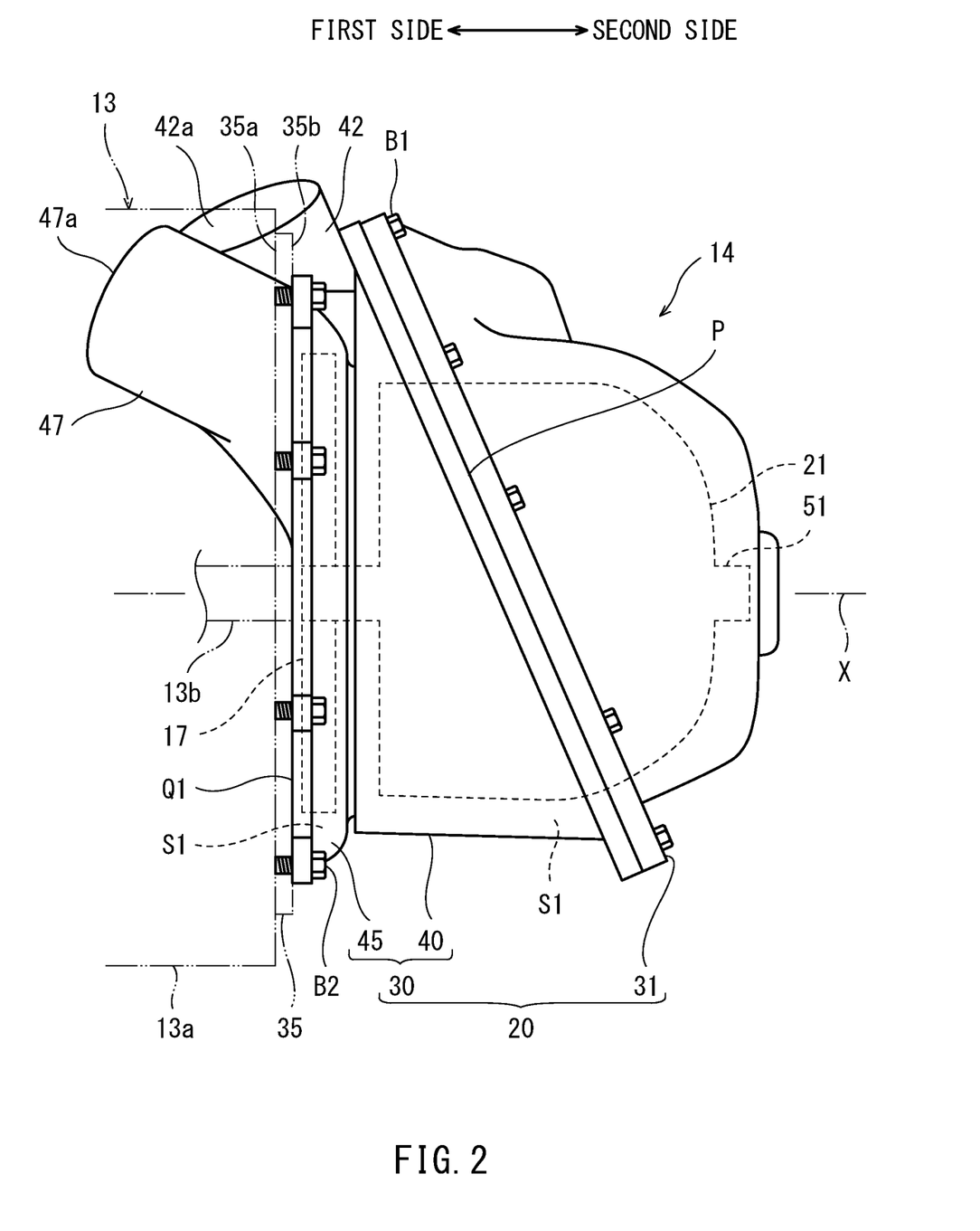
FIG. 2 is a side view of a continuously variable transmission of FIG. 1 when viewed from a front side of the vehicle.

FIG. 2 is a side view of the continuously variable transmission 14 of FIG. 1 when viewed from a front side of the vehicle. As shown in FIG. 2, the continuously variable transmission 14 is lined up with respect to the internal combustion engine 13 in a predetermined arrangement direction. The arrangement direction is the same as a direction in which an axis X of an input shaft 51 of a CVT structure 21 extends. The direction in which the axis X extends may be referred to as an axial direction X. In the following description, the arrangement direction is referred to as the axial direction X. A side of the continuously variable transmission 14 which is close to the internal combustion engine 13 in the axial direction X is referred to as a first side, and a side of the continuously variable transmission 14 which is far from the internal combustion engine 13 in the axial direction X is referred to as a second side.

The internal combustion engine 13 includes a crank case 13a and a crank shaft 13b projecting from the crank case 13a to an outside. The crank case 13a is one example of a prime mover case, and the crank shaft 13b is one example of a driving shaft of the prime mover. The continuously variable transmission 14 includes a CVT case 20 and the CVT structure 21 accommodated in the CVT case 20. The crank shaft 13b of the internal combustion engine 13 is coupled to the input shaft 51 of the CVT structure 21 so as to be able to transmit power to the input shaft 51. The CVT structure 21 changes the rotational speed of the rotational power input from the crank shaft 13b.

The CVT case 20 includes a case main body 30 and a cover 31. The case main body 30 and the cover 31 are made of resin. The case main body 30 defines a main accommodating space S1 together with the cover 31. The CVT case 20 includes a main opening P through which the main accommodating space S1 is open toward the second side in the axial direction X. The cover 31 closes the main opening P of the case main body 30 and is fixed to the case main body 30 with bolts B1.

The case main body 30 includes a main case 40 and an auxiliary case 45. The main case 40 defines the main accommodating space S1. The auxiliary case 45 defines an auxiliary accommodating space S2 and is fixed to the main case 40. The main case 40 is one piece made by integral molding, and the auxiliary case 45 is also one piece made by integral molding. The CVT structure 21 is in the main accommodating space S1. A flywheel 17 fixed to the crank shaft 13b or the input shaft 51 is in the auxiliary accommodating space S2.

The auxiliary case 45 includes an opening Q1 through which the auxiliary accommodating space S2 is open toward the internal combustion engine 13. The opening Q1 is closed by a plate 35 fixed to a side surface of the internal combustion engine 13. The auxiliary case 45 includes an inflow opening 47a into which the cooling air flows from the air-intake pipe 16 (see FIG. 1). The inflow opening 47a communicates with the main accommodating space S1 through a cooling air passage S3 (see FIG. 4) between the main case 40 and the auxiliary case 45. The main case 40 includes an outflow opening 42a through which the cooling air in the main accommodating space S1 flows to an outside.

The flat plate 35 is fixed to a side surface of the crank case 13a. The plate 35 is located so as to be orthogonal to the axial direction X. The plate 35 includes a first surface 35a and a second surface 35b. The first surface 35a is opposed to the internal combustion engine 13, and the second surface 35b is opposed to the CVT case 20. The auxiliary case 45 of the CVT case 20 is fixed to the plate 35 with bolts B2.

Figure 3:
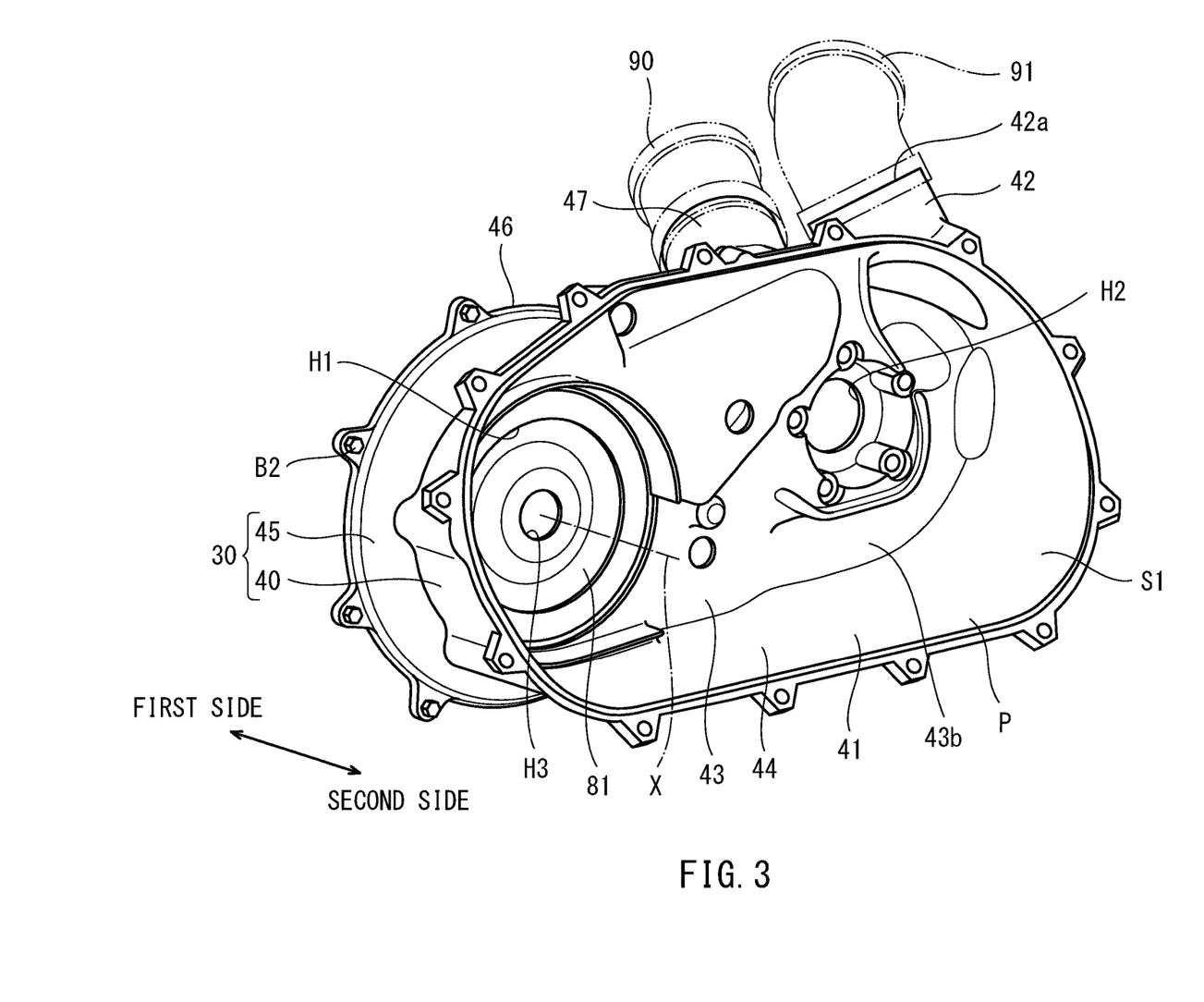
FIG. 3 is a perspective view of a case main body of the continuously variable transmission of FIG. 2.

FIG. 3 is a perspective view of the case main body 30 of the continuously variable transmission 14 of FIG. 2. As shown in FIG. 3, the main case 40 of the case main body 30 includes a main case main body portion 41 and a fitting portion 42. The main case main body portion 41 has a recessed sectional shape that is open toward the second side in the axial direction X. The auxiliary case 45 of the case main body 30 includes an auxiliary case main body portion 46 and a fitting portion 47 projecting from the auxiliary case main body portion 46. The main case main body portion 41 includes a bottom wall 43 and a peripheral wall 44. The bottom wall 43 is opposed to the CVT structure 21 (see FIG. 4) in the axial direction X. The peripheral wall 44 projects from an outer end of the bottom wall 43 toward the second side in the axial direction X. The bottom wall 43 includes a first surface 43a (see FIG. 6) and a second surface 43b. The first surface 43a faces the first side in the axial direction X. The second surface 43b faces the second side in the axial direction X.

The bottom wall 43 includes a first through hole H1 and a second through hole H2. The input shaft 51 (see FIG. 4) extends through the first through hole H1. An output shaft 52 (see FIG. 4) extends through the second through hole H2. The first through hole H1 is larger than the second through hole H2 and also serves as a cooling air flow-through hole. The fitting portion 42 projects outward from the peripheral wall 44 of the main case main body portion 41. The fitting portion 42 includes the outflow opening 42a. A connection duct 91 connected to an exhaust pipe is attached to the fitting portion 42.

Figure 4:
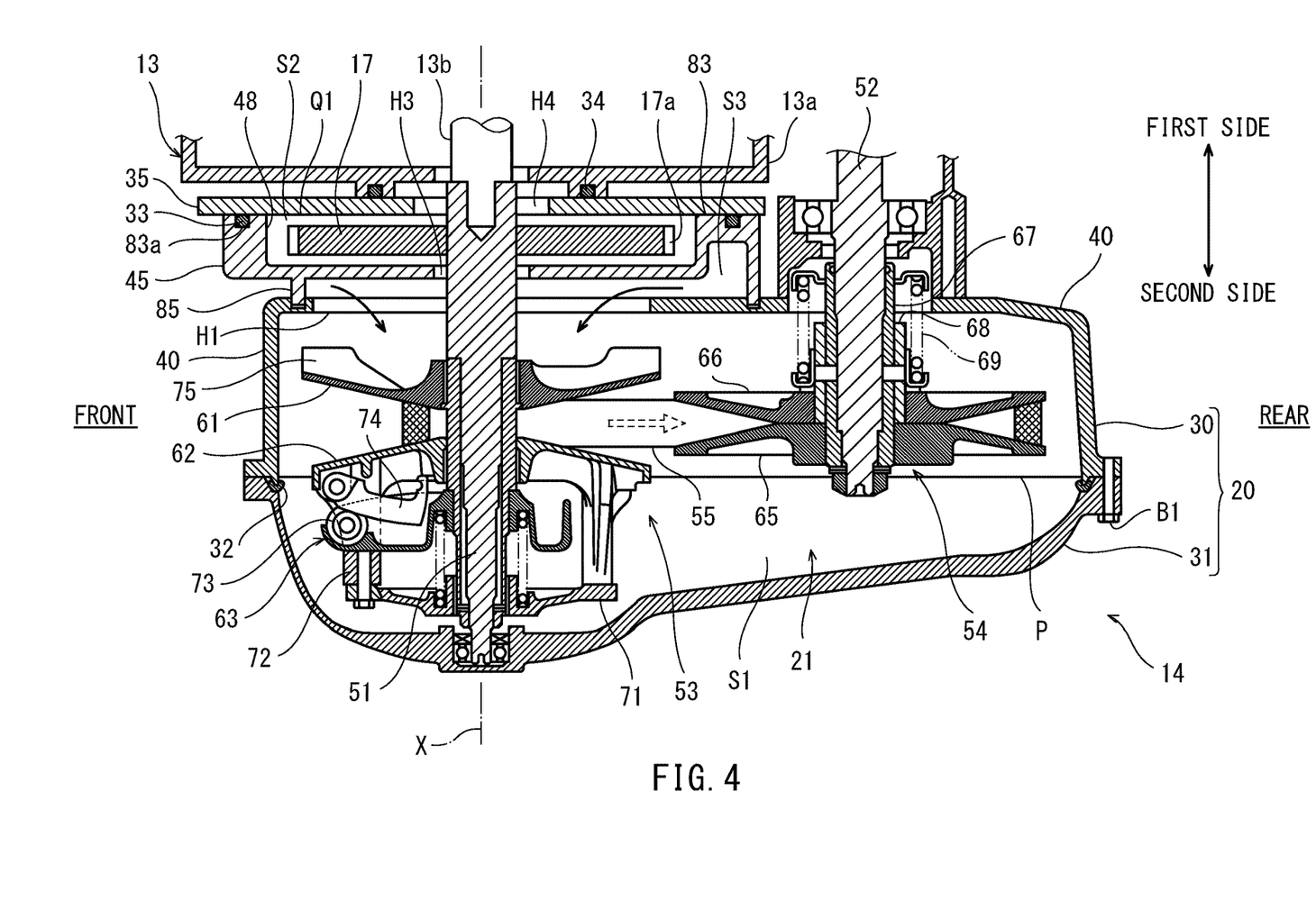
FIG. 4 is a horizontal sectional view of the continuously variable transmission of FIG. 2.

FIG. 4 is a horizontal sectional view of the continuously variable transmission 14 of FIG. 2. As shown in FIG. 2, the CVT structure 21 includes the input shaft 51, the output shaft 52, a driving pulley 53, a driven pulley 54, and a belt 55.

The axis X of the input shaft 51 and an axis of the crank shaft 13b are located on the same straight line. Rotational power is input from the crank shaft 13b of the internal combustion engine 13 to the input shaft 51. The driving pulley 53 is at the input shaft 51 so as to rotate integrally with the input shaft 51. The driven pulley 54 is at the output shaft 52 so as to rotate integrally with the output shaft 52. The output shaft 52 outputs the rotational power to one or both of the front wheels 3 and the rear wheels 4. The belt 55 having a V shape is wound around the driving pulley 53 and the driven pulley 54.

The driving pulley 53 includes: a fixed sheave 61 fixed to the input shaft 51; a movable sheave 62 fitted to the input shaft 51 so as to be movable in the axial direction X1; and a sheave thruster 63. The belt 55 is sandwiched between pressure surfaces of the fixed sheave 61 and the movable sheave 62. When the movable sheave 62 moves along the input shaft 51, and this changes an interval between the fixed sheave 61 and the movable sheave 62, a position, where the belt 55 is sandwiched, at the driving pulley 53 in a radial direction of the driving pulley 53 changes, i.e., an effective diameter of the driving pulley 53 changes.

For example, the sheave thruster 63 is of a flyweight type. The sheave thruster 63 mechanically moves the movable sheave 62 relative to the fixed sheave 61 in accordance with a rotational frequency of the driving pulley 53 such that the movable sheave 62 approaches or separates from the fixed sheave 61 in the axial direction X. The sheave thruster 63 includes a receiving plate 71, a coupling arm 72, a pressure receiving roller 73, and a flyweight 74. The receiving plate 71 is located at a back surface side of the movable sheave 62 and away from the movable sheave 62 in the axial direction X. The pressure receiving roller 73 is supported by the receiving plate 71 through the coupling arm 72. The flyweight 74 is located at the back surface side of the movable sheave 62 and is supported by the movable sheave 62 while being in contact with the pressure receiving roller 73.

The flyweight 74 turns in a direction away from the movable sheave 62 by rotational centrifugal force of the driving pulley 53 to press the pressure receiving roller 73 in the axial direction X1 and moves the movable sheave 62 in a direction toward the fixed sheave 61 by reaction force from the pressure receiving roller 73. To be specific, by the rotational centrifugal force of the driving pulley 53, the sheave thruster 63 generates thrust that narrows the interval between the fixed sheave 61 and the movable sheave 62. A centrifugal fan blade 75 that generates swirling flow is on a back surface of the fixed sheave 61.

The driven pulley 54 includes: a fixed sheave 65 fixed to the output shaft 52; and a movable sheave 66 fitted to the output shaft 52 so as to be movable in an axial direction of the output shaft 52. A cam cylinder 67 including spiral cam grooves is fixed to an outer peripheral surface of the output shaft 52. The cam cylinder 67 and the fixed sheave 65 rotate together with the output shaft 52. A sleeve 68 is integrally coupled to an inner peripheral end of the movable sheave 66. The sleeve 68 is fitted to an outer peripheral surface of the cam cylinder 67 so as to be movable in the axial direction of the output shaft 52 and supports a roller that is movable along the cam grooves of the cam cylinder 67.

The sleeve 68 is biased toward the fixed sheave 65 by a pressure regulating spring 69, and the movable sheave 66 is pressed toward the fixed sheave 65. When the movable sheave 66 receives rotational force by tensile force of the belt 55, thrust that moves the movable sheave 66 toward the fixed sheave 65 is generated by a cam action between the cam cylinder 67 and the roller.

When the rotational frequency of the input shaft 51 is low, the effective diameter of the driving pulley 53 is small, and the effective diameter of the driven pulley 54 is large (i.e., a reduction ratio is high). When the rotational frequency of the input shaft 51 increases, the movable sheave 62 approaches the fixed sheave 61 by the thrust of the sheave thruster 63 generated by the increase in centrifugal force, and this increases the effective diameter of the driving pulley 53. At the driven pulley 54, the tensile force of the belt 55 increases, and this increases force acting toward a radially inner side of the belt 55. Then, the movable sheave 66 moves in a direction away from the fixed sheave 65 against spring force of the pressure regulating spring 69 and cam thrust of the cam cylinder 67, and this decreases the effective diameter of the driven pulley 54 (i.e., the reduction ratio becomes low).

The first through hole H1 of the main case 40 is opposed to a radially inner portion of the centrifugal fan blade 75. The first through hole H1 makes the cooling air passage S3, defined between the main case 40 and the auxiliary case 45, communicate with the main accommodating space S1. When the centrifugal fan blade 75 rotates to generate swirling flow, the cooling air of the cooling air passage S3 flows through the first through hole H1 and is sucked into the main accommodating space S1.

The auxiliary case 45 includes a through hole H3 through which the input shaft 51 extends. The plate 35 includes a first through hole H4 through which the crank shaft 13b is inserted. The auxiliary accommodating space S2 of the auxiliary case 45 is open toward the first side in the axial direction X. The auxiliary accommodating space S2 of the auxiliary case 45 is closed by the plate 35 from the first side in the axial direction X.

A first recess 48 defining the auxiliary accommodating space S2 of the auxiliary case 45 includes a contact surface 83 that contacts the plate 35. The contact surface 83 includes a seal groove 83a surrounding the opening Q1 of the auxiliary accommodating space S2 when viewed in the axial direction X. A first seal 33 is in the seal groove 83a. The first seal 33 is located circumferentially so as to surround the opening Q1 of the auxiliary accommodating space S2 and is sandwiched between the plate 35 and the auxiliary case 45.

The flywheel 17 is between the plate 35 and the CVT case 20 and is specifically in the auxiliary accommodating space S2. The flywheel 17 includes an external-teeth outer peripheral gear 17a at an outer peripheral portion thereof. To be specific, the flywheel 17 serves as a first gear that is between the internal combustion engine 13 and the CVT case 20 and rotates together with the crank shaft 13b. Driving power of a below-described starter motor 18 (see FIG. 9) is input to the outer peripheral gear 17a of the flywheel 17.

A second seal 34 is sandwiched between the crank case 13a and the plate 35. The second seal 34 is located circumferentially along a peripheral edge of the first through hole H4 of the plate 35. A seal ring 32 is sandwiched between the main case 40 and the cover 31. The main accommodating space S1 and the auxiliary accommodating space S2 are sealed spaces except for the inflow opening 47a and the outflow opening 42a.

Figure 5:
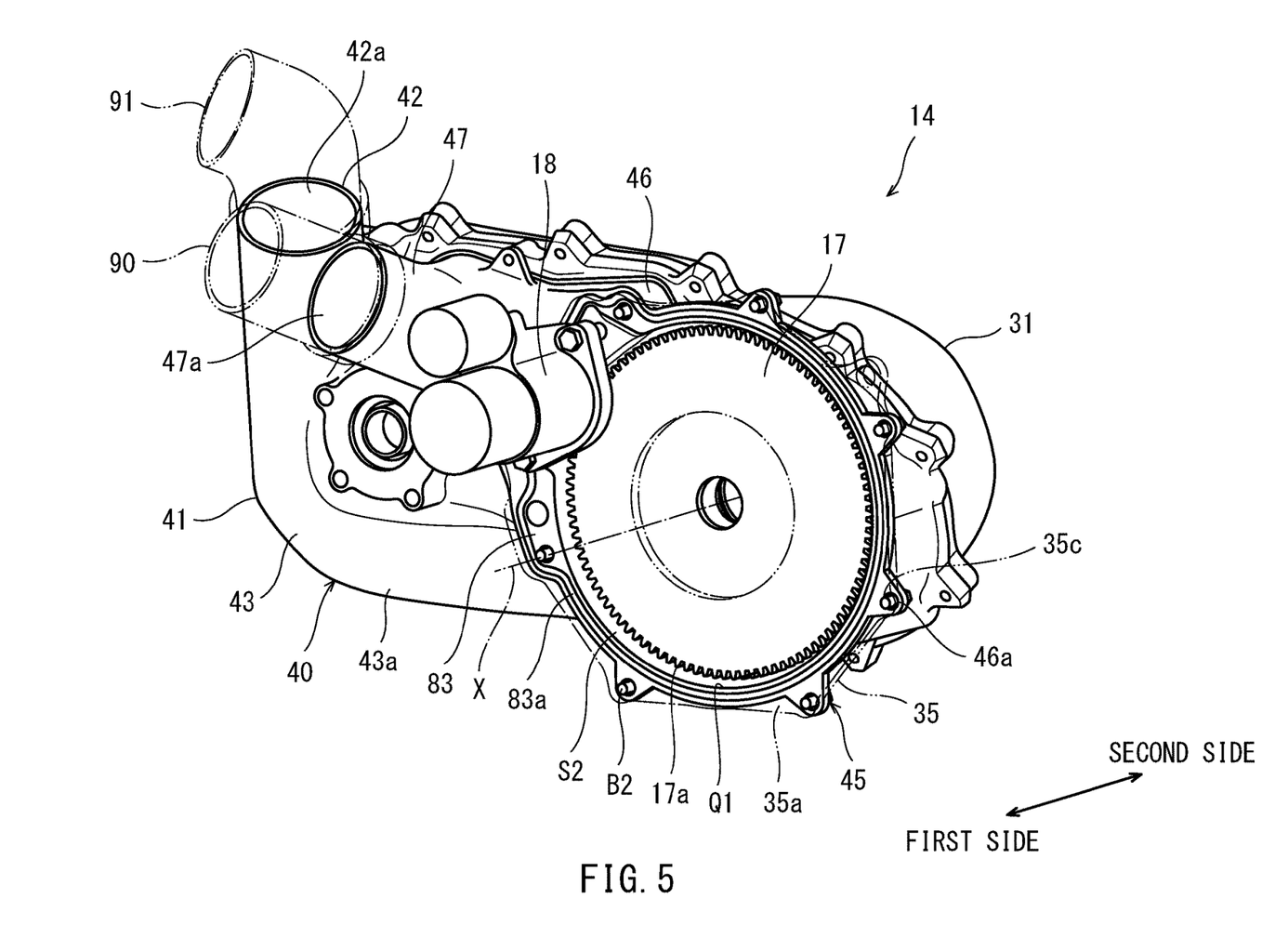
FIG. 5 is a perspective view of the continuously variable transmission of FIG. 2 when viewed from a first side.

FIG. 5 is a perspective view of the continuously variable transmission 14 of FIG. 2 when viewed from the first side. As shown in FIG. 5, the auxiliary case main body portion 46 of the auxiliary case 45 includes bolt holes 46a that coincide with bolt holes 35c of the plate 35. The auxiliary case 45 of the case main body 30 is fixed to the plate 35 with the bolts B2 inserted through the bolt holes 35c and 46a. The starter motor 18 as an energy converter is fixed to the plate 35. The starter motor 18 is an electric motor. The starter motor 18 is at the first side of the plate 35 in the axial direction X and is in contact with the first surface 35a of the plate 35. The starter motor 18 is adjacent to a cylinder of the internal combustion engine 13 (see FIG. 4) in a direction orthogonal to the axial direction X.

Figure 6:
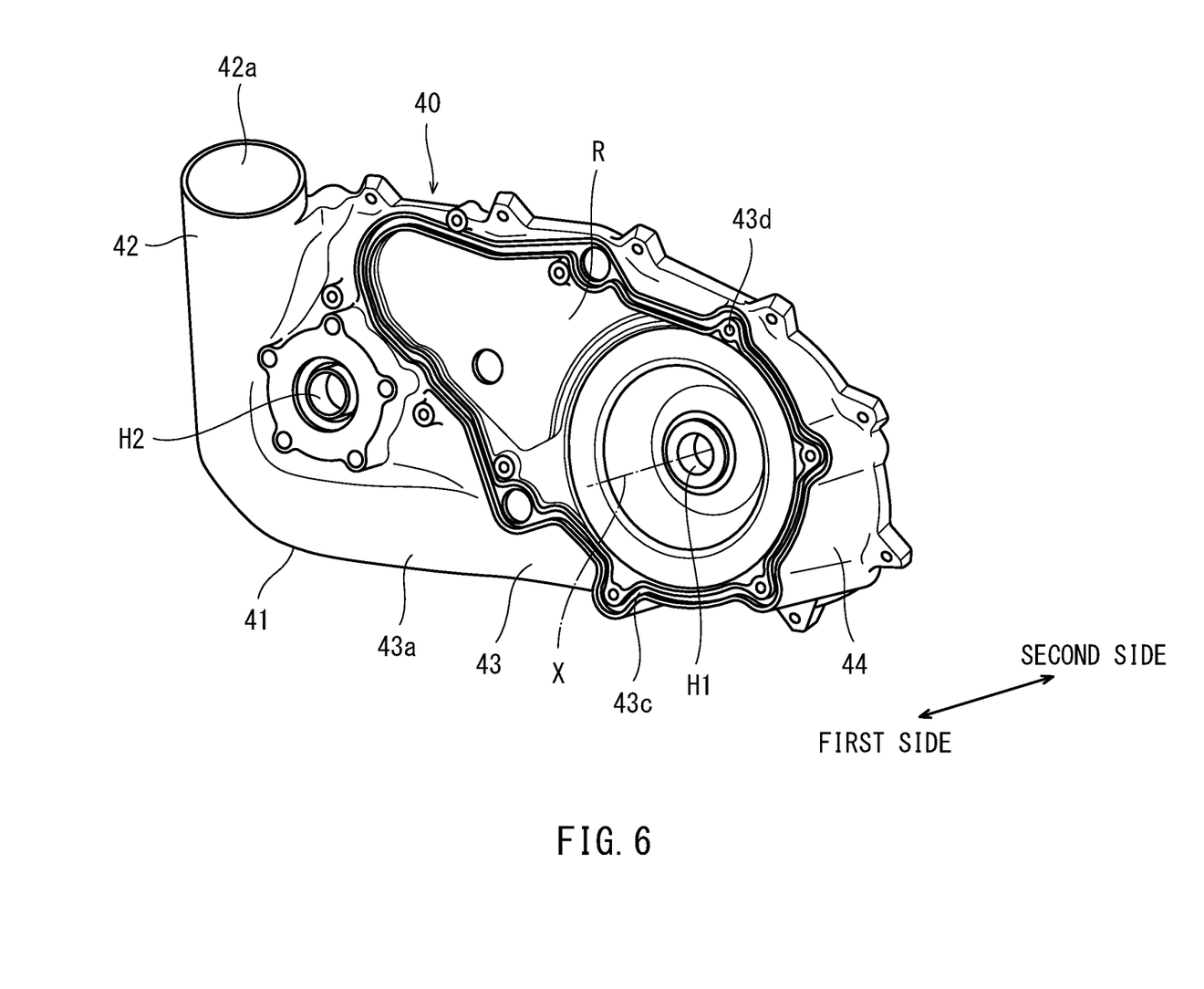
FIG. 6 is a perspective view of a main case of the case main body of FIG. 4 when viewed from the first side.

FIG. 6 is a perspective view of the main case 40 of the case main body 30 of FIG. 4 when viewed from the first side. As shown in FIG. 6, the first surface 43a of the bottom wall 43 of the main case 40 includes a circumferential seal groove 43c surrounding the first through hole H1 when viewed in the axial direction X. A region R of the bottom wall 43 which is surrounded by the seal groove 43c extends to a region at an upper side of the second through hole H2. The first surface 43a of the bottom wall 43 includes bolt holes 43d located at intervals along the seal groove 43c. The region R surrounded by the seal groove 43c is a recess that is recessed toward the second side in the axial direction X. However, the region R does not have to be the recess.

Figure 7:
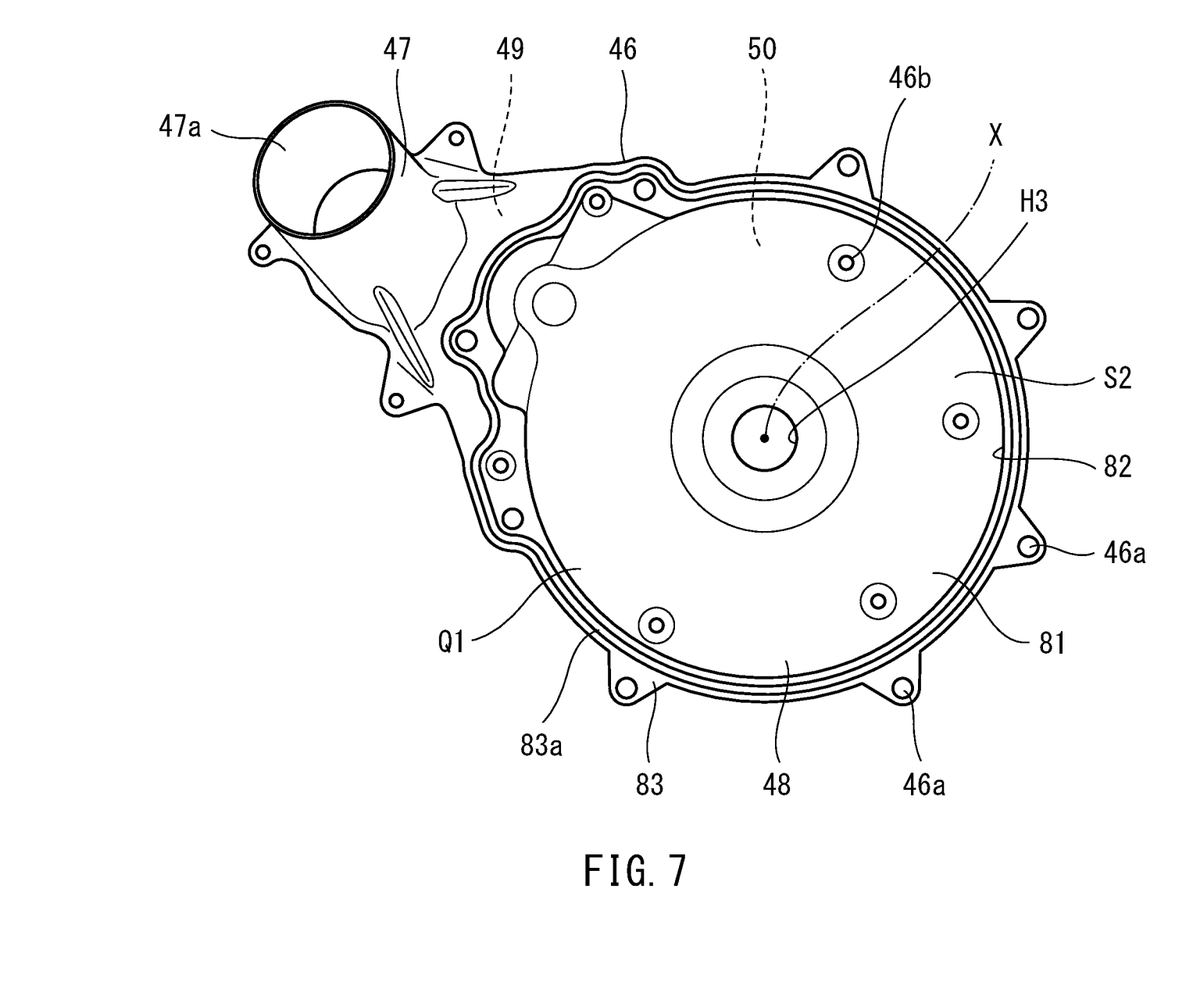
FIG. 7 is a perspective view of an auxiliary case of the case main body of FIG. 4 when viewed from the first side.

FIG. 7 is a perspective view of the auxiliary case 45 of the case main body 30 of FIG. 4 when viewed from the first side. As shown in FIG. 7, the auxiliary case main body portion 46 of the auxiliary case 45 includes the first recess 48 that defines the auxiliary accommodating space S2. The first recess 48 includes a bottom wall 81 and a side wall 82 projecting from an outer edge of the bottom wall 81 toward the first side in the axial direction X. The bottom wall 81 includes the through hole H3 through which the input shaft 51 (see FIG. 4) extends.

The auxiliary case main body portion 46 includes the contact surface 83 that is in contact with the plate 35 at a position around the opening Q1 of the first recess 48. The contact surface 83 is in surface-contact with the second surface 35b of the plate 35. The contact surface 83 includes the seal groove 83a surrounding the opening Q1. The fitting portion 47 projects toward the first side in the axial direction X, and the inflow opening 47a is directed toward the first side in the axial direction X.

Figure 8:
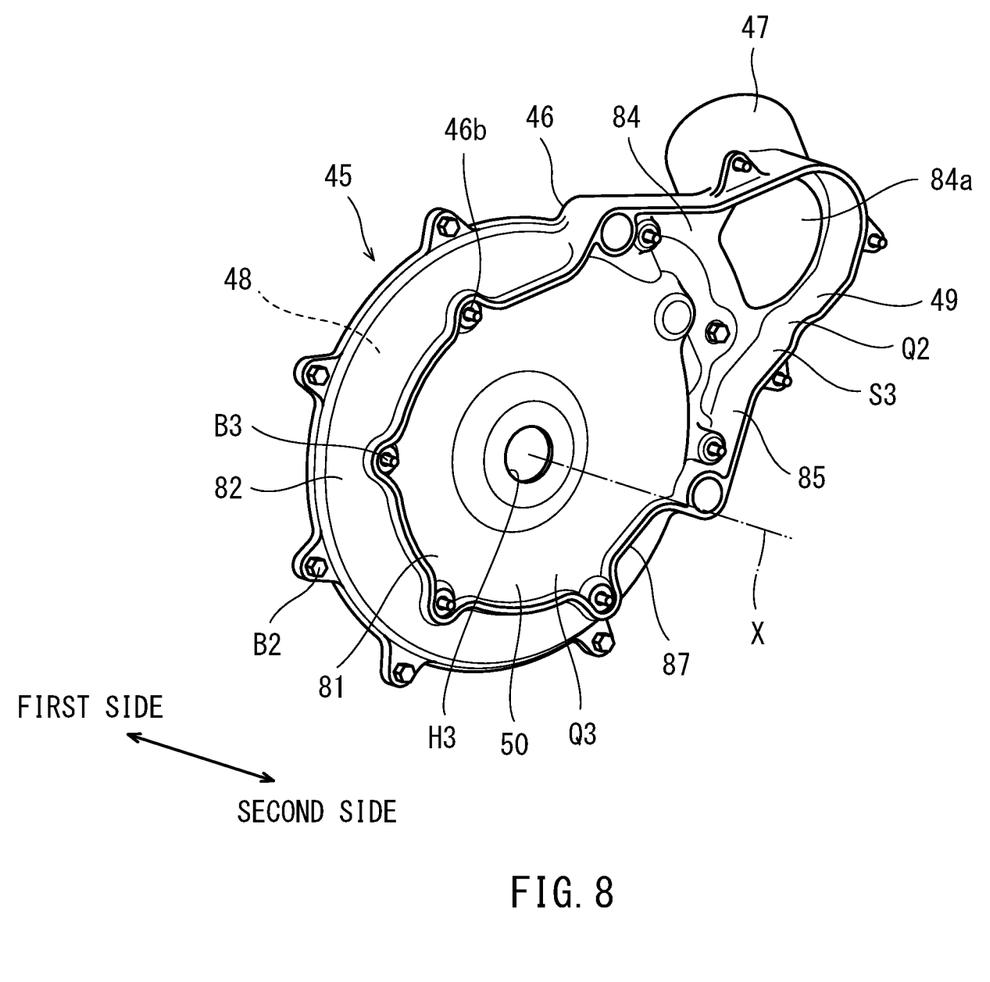
FIG. 8 is a perspective view of the auxiliary case of FIG. 7 when viewed from a second side.

FIG. 8 is a perspective view of the auxiliary case 45 of FIG. 7 when viewed from the second side. As shown in FIG. 8, the auxiliary case main body portion 46 of the auxiliary case 45 includes a second recess 49 that is adjacent to the first recess 48 in a direction orthogonal to the axial direction X. The second recess 49 includes an opening Q2 that is open toward the second side in the axial direction X. The second recess 49 includes a bottom wall 84 and a side wall 85 that projects from an outer edge of the bottom wall 84 toward the second side in the axial direction X. The bottom wall 84 of the second recess 49 includes a communication hole 84a that communicates with an internal passage of the fitting portion 47. The bottom wall 84 of the second recess 49 is located at the first side of the bottom wall 81 of the first recess 48 in the axial direction X. A part of the side wall 82 of the first recess 48 serves as the side wall of the second recess 49. The side wall 85 of the second recess 49 is continuous with the side wall 82 of the first recess 48.

The auxiliary case main body portion 46 includes a third recess 50 located at a back side of the first recess 48. The third recess 50 includes an opening Q3 that is open toward the second side in the axial direction X. A part of the bottom wall 81 of the first recess 48 is used as a bottom wall of the third recess 50. The third recess 50 includes a side wall 87 that projects toward the second side in the axial direction X from a surface of the bottom wall 81 which is located at the second side in the axial direction X. The side wall 87 has a C shape and surrounds the through hole H3 when viewed in the axial direction X. Since the side wall 87 of the third recess 50 is continuous with the side wall 85 of the second recess 49, the entirety of the side wall 85 and the side wall 87 has a circumferential shape. The second recess 49 and the third recess 50 are continuous with each other such that the entirety of the second recess 49 and the third recess 50 is one recess that is open toward the second side in the axial direction X. The auxiliary case main body portion 46 includes bolt holes 46b located at intervals along the side wall 85 and the side wall 87.

Figure 9:
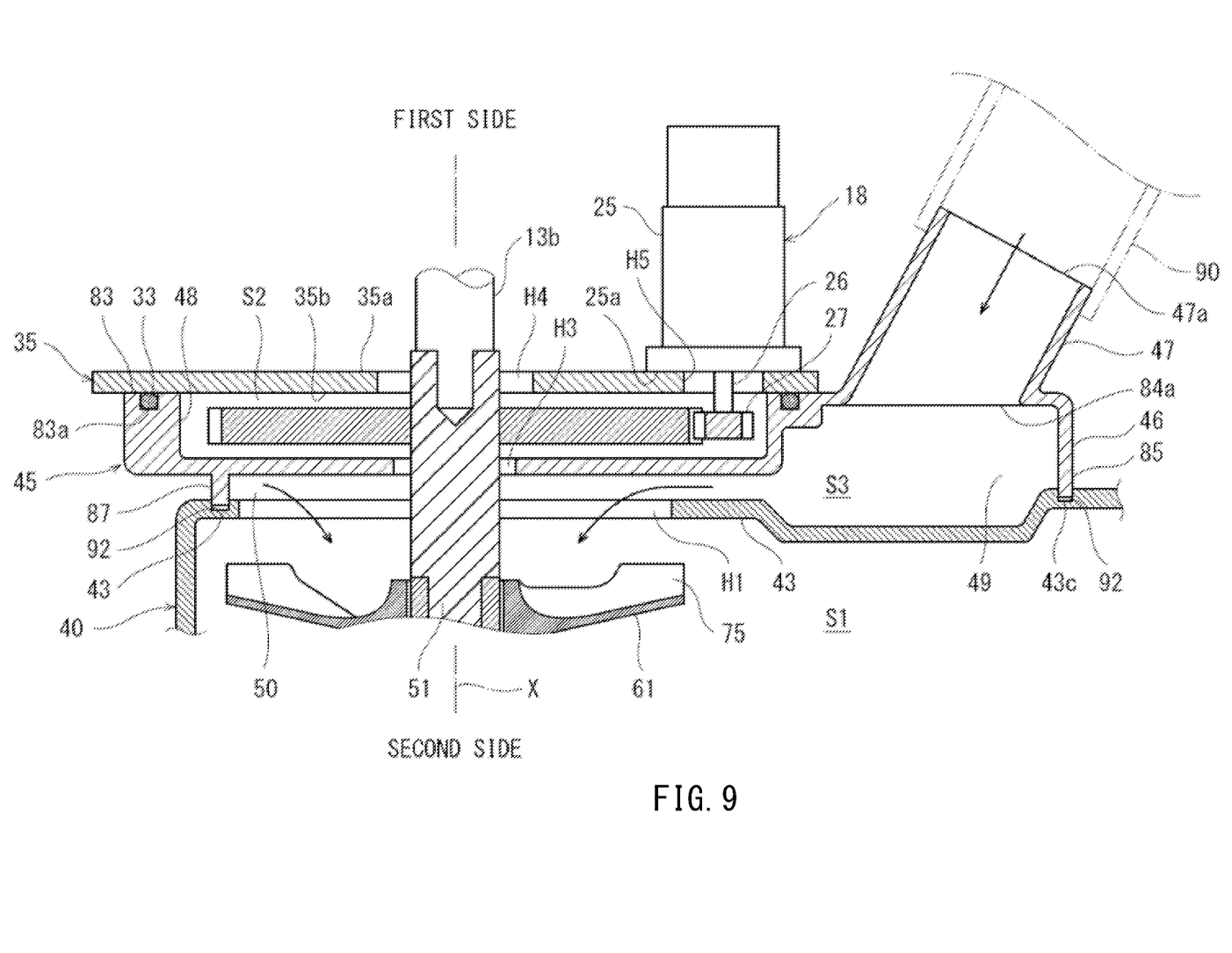
FIG. 9 is a horizontal sectional view of a portion of the continuously variable transmission of FIG. 2 containing a cooling air passage of the case main body.

FIG. 9 is a horizontal sectional view of a portion of the continuously variable transmission of FIG. 2 containing a cooling air passage of the case main body. As shown in FIG. 9, the plate 35 includes a second through hole H5 that communicates with the auxiliary accommodating space S2. A housing 25 of the starter motor 18 is fixed to the plate 35 with bolts. A rotor and a stator as an electromagnetic driving source are accommodated in the housing 25. An end surface 25a of the housing 25 is in surface contact with the first surface 35a of the plate 35 so as to close the second through hole H5. A circumferential seal may be between the end surface 25a of the housing 25 and the plate 35 so as to surround the second through hole H5.

The starter motor 18 includes a rotating shaft 26 that projects from the end surface 25a of the housing 25 toward the second side in the axial direction X. The rotating shaft 26 includes a motor driving shaft fixed to the rotor in the housing 25. The rotating shaft 26 may be inserted through the second through hole H5 of the plate 35. A motor gear 27 is fixed to a tip portion of the rotating shaft 26. The rotating shaft 26 and the motor gear 27 rotate in association with each other. The motor gear 27 may mesh with the outer peripheral gear 17a of the flywheel 17 in the auxiliary accommodating space S2. The motor gear 27 is a second gear that may mesh with the outer peripheral gear 17a as the first gear. The starter motor 18 can separate the motor gear 27 from the outer peripheral gear 17a by accommodating the rotating shaft 26 in the housing 25.

A projecting end of the side wall 85 of the second recess 49 of the auxiliary case 45 and a projecting end of the side wall 87 of the third recess 50 of the auxiliary case 45 are inserted into the seal groove 43c of the main case 40 through an adhesive 92. The adhesive 92 is filled in the seal groove 43c over the entire periphery. To be specific, the adhesive 92 achieves not only a function of fixing the auxiliary case 45 to the main case 40 but also a sealing function. Moreover, the auxiliary case 45 is fixed to the main case 40 also with bolts B3 (see FIG. 8) inserted through the bolt holes 43d (see FIG. 6) and the bolt holes 46b (see FIG. 8).

The second recess 49 and the third recess 50 of the auxiliary case 45 define the cooling air passage S together with the bottom wall 43 of the main case 40. The second recess 49 defines an upstream space of the cooling air passage S3, and the third recess 50 defines a downstream space of the cooling air passage S3. The bottom wall 43 of the main case 40 is recessed toward the second side in the axial direction X in a region of the auxiliary case 45 which is opposed to the communication hole 84a. A connection duct 90 connected to the air-intake pipe 16 (see FIG. 1) is fitted to the fitting portion 47.

The fitting portion 47 is not connected to the auxiliary case main body portion 46 from a direction orthogonal to the axial direction X but is connected to the auxiliary case main body portion 46 from the first side in the axial direction X. The second recess 49 of the auxiliary case 45 is adjacent to both the first recess 48 and the third recess 50 in the direction orthogonal to the axial direction X. To be specific, the second recess 49 overlaps both the first recess 48 and the third recess 50 when viewed in the direction orthogonal to the axial direction X.

The cooling air from the air-intake pipe 16 (see FIG. 1) flows through the connection duct 90 into the inflow opening 47a, flows through the internal passage of the fitting portion 47, and reaches the cooling air passage S3. The cooling air that has reached the cooling air passage S3 is introduced to the main accommodating space S1 through the first through hole H1 of the main case 40.

According to the above-described configuration, the first seal 33 is between the first recess 48 of the CVT case 20 and the plate 35. Therefore, dust can be prevented from getting into the auxiliary accommodating space S2, in which the outer peripheral gear 17a of the flywheel 17 is, through a gap between the CVT case 20 and the plate 35. Therefore, it is possible to prevent a case where the dust gets stuck between the outer peripheral gear 17a of the flywheel 17 and the motor gear 27, and the starter motor 18 becomes overloaded.

The second seal 34 is between the internal combustion engine 13 and the plate 35 at a position around the first through hole H4 of the plate 35. Therefore, the dust can be prevented from getting into the auxiliary accommodating space S2, in which the outer peripheral gear 17a of the flywheel 17 is, through a gap between the internal combustion engine 13 and the plate 35.

The end surface 25a of the housing 25 of the starter motor 18 is in contact with the first surface 35a of the plate 35 at a position around the second through hole H5 of the plate 35. Therefore, the dust can be prevented from getting into the auxiliary accommodating space S2, in which the outer peripheral gear 17a of the flywheel 17 is, through a gap between the starter motor 18 and the plate 35.

The inflow opening 47a is at not the main case 40 but the auxiliary case 45, and the cooling air passage S3 is between the main case 40 and the auxiliary case 45. Therefore, the degree of freedom of the design of the individual cases 40 and 45 can be improved.

The first seal 33 is in the seal groove 83a of the contact surface 83 of the auxiliary case 45. Therefore, foreign matters can be prevented from getting into the auxiliary accommodating space S2 through between the plate 35 and the auxiliary case 45.

The second recess 49 of the auxiliary case 45 that defines the cooling air passage S3 between the main case 40 and the auxiliary case 45 is adjacent to the first recess 48 in the direction orthogonal to the axial direction X. Therefore, the auxiliary case 45 can be reduced in size in the axial direction X.

Since the second recess 49 defines the upstream space of the cooling air passage S3, and the third recess 50 defines the downstream space of the cooling air passage S3, the adequate cooling air passage can be realized while preventing the increase in size of the auxiliary case 45.

The second recess 49 is adjacent to both the first recess 48 and the third recess 50 in the direction orthogonal to the axial direction X. Therefore, the auxiliary case 45 can be reduced in size in the axial direction X while adequately realizing the cooling air passage S3.

Since the auxiliary case 45 includes the fitting portion 47, work of fixing a separate fitting, to which the air-intake duct 90 is connected, to the CVT case 20 is unnecessary.

The fitting portion 47 projects from the bottom wall 84 of the second recess 49 toward the first side in the axial direction X. Therefore, the second recess 49 does not have to be increased in size in the axial direction X, and the degree of freedom of the arrangement of the fitting portion 47 can be improved.

In the present embodiment, the internal combustion engine 13 is described as the prime mover. However, the present embodiment is not limited to this. Instead of the internal combustion engine 13, the prime mover may be an electric motor. When the prime mover is the electric motor, the crank case 13a is a motor housing, and the crank shaft 13b is a motor driving shaft. The continuously variable transmission 14 may be a transmission other than a belt transmission. The first gear in the auxiliary accommodating space S2 is not limited to the outer peripheral gear 17a of the flywheel 17 but may be a simple gear that is not a flywheel.

In the present embodiment, the starter motor 18 is described as the energy converter fixed to the plate 35. However, the present embodiment is not limited to this. For example, the energy converter may be a power generator that is driven in association with the rotation of the crank shaft 13b. The energy converter may be a pump that is driven in association with the rotation of the crank shaft 13b. To be specific, the energy converter may be an electric motor that converts electric energy into rotational mechanical energy, may convert rotational mechanical energy into electric energy, or may convert rotational mechanical energy into hydraulic energy.

The fixing of the auxiliary case 45 to the main case 40 is performed by the adhesive 92 and the bolts B3. However, the present embodiment is not limited to this. For example, in a state where the projecting end of the side wall 85 of the second recess 49 of the auxiliary case 45 and the projecting end of the side wall 87 of the third recess 50 of the auxiliary case 45 are in the seal groove 43c of the main case 40, the projecting ends may be welded to the main case 40. Moreover, the case main body 30 may be one piece.

As described above, the embodiment has been described as an example of the technology disclosed in the present application. However, the technology in the present disclosure is not limited to this and is also applicable to embodiments in which modifications, replacements, additions, omissions, and the like are suitably made. Moreover, a new embodiment may be prepared by combining the components described in the above embodiment. Some components in an embodiment may be separated and arbitrarily extracted from the other components in the embodiment. Furthermore, the components shown in the attached drawings and the detailed explanations include not only components essential to solve the problems but also components for exemplifying the above technology and not essential to solve the problems.

What is claimed is:

1. A driving source assembly comprising:
   a prime mover including a driving shaft;
   a continuously variable transmission including a CVT structure and a CVT case and lined up with respect to the prime mover in a predetermined arrangement direction, the CVT structure changing rotational speed of rotational power input from the driving shaft, the CVT case defining a main accommodating space accommodating the CVT structure;
   a first gear that is between the prime mover and the CVT case and rotates together with the driving shaft;
   a second gear that is meshable with the first gear;
   an energy converter including a rotating shaft that rotates in association with the second gear;
   a plate which includes a first surface and a second surface and is fixed to the prime mover and to which the energy converter is fixed, the first surface being opposed to the prime mover and the energy converter, the second surface being opposed to the CVT case; and
   a seal, wherein:
   a side of the continuously variable transmission which is close to the prime mover in the arrangement direction is referred to as a first side;
   a side of the continuously variable transmission which is far from the prime mover in the arrangement direction is referred to as a second side;
   the first gear is between the plate and the CVT case;
   the CVT case includes a recess that defines an auxiliary accommodating space accommodating the first gear and is open toward the first side in the arrangement direction;
   the plate closes an opening of the recess from the first side in the arrangement direction; and
   the seal surrounds the opening and is between the recess and the plate.

2. The driving source assembly according to claim 1, wherein:
   the seal is a first seal;
   the plate further includes a first insertion hole in which the driving shaft is; and
   the driving source assembly further includes a second seal that is between the prime mover and the plate at a position around the first insertion hole.

3. The driving source assembly according to claim 1, wherein:
   the plate further includes a second insertion hole in which the rotating shaft is;
   the energy converter includes a housing including an end surface opposed to the plate; and
   the end surface of the housing is in surface contact with the first surface of the plate at a position around the second insertion hole.

4. The driving source assembly according to claim 1, wherein:
   the prime mover includes an internal combustion engine;
   the driving shaft includes a crank shaft; and
   the first gear is a flywheel that is at the crank shaft and includes external teeth at an outer peripheral portion of the flywheel.

5. The driving source assembly according to claim 4, wherein the energy converter includes a starter motor.

6. The driving source assembly according to claim 1, wherein:
   the CVT case includes:

a case main body including a main opening through which the main accommodating space is open toward the second side in the arrangement direction, and a cover that is attached to the case main body and closes the main opening; and the case main body includes:

a main case defining the main accommodating space, an auxiliary case including the recess and an inflow opening which communicates with the main accommodating space and into which the cooling air flows, the auxiliary case being fixed to the main case, and a cooling air passage which is between the main case and the auxiliary case and through which the inflow opening communicates with the main accommodating space.

7. The continuously variable transmission according to claim 6, wherein:

the auxiliary case includes a contact surface that is in contact with the plate at a position around the opening of the recess;

the contact surface includes a seal groove surrounding the opening of the recess of the auxiliary case; and the seal is at the seal groove.

8. The continuously variable transmission according to claim 6, wherein:

the recess includes a first recess; and the auxiliary case further includes a second recess that is adjacent to the first recess in a direction orthogonal to the arrangement direction, defines the cooling air passage between the main case and the second recess, and is open toward the second side in the arrangement direction.

9. The continuously variable transmission according to claim 8, wherein the auxiliary case is one piece, the auxiliary case includes:

an auxiliary case main body portion including the recess; and a tubular fitting portion projecting from the auxiliary case main body portion and including the inflow opening, and the tubular fitting portion projects from a bottom wall of the second recess toward the first side in the arrangement direction.

10. The continuously variable transmission according to claim 8, wherein:

the auxiliary case further includes a third recess that is open toward the second side in the arrangement direction, a bottom wall of the first recess being used as a bottom wall of the third recess, and;

the second recess and the third recess are continuous with each other;

entirety of the second recess and the third recess includes a recess that is open toward the second side in the arrangement direction;

the second recess defines an upstream space of the cooling air passage; and the third recess defines a downstream space of the cooling air passage.

11. The continuously variable transmission according to claim 10, wherein the second recess is adjacent to both the first recess and the third recess in the direction orthogonal to the arrangement direction.

12. The driving source assembly according to claim 6, wherein:

the auxiliary case is one piece; and the auxiliary case includes:

an auxiliary case main body portion including the recess; and a tubular fitting portion projecting from the auxiliary case main body portion and including the inflow opening.

* * * * *